(12) United States Patent
Liu (10) Patent No.: US 12,238,412 B2
(45) Date of Patent: Feb. 25, 2025

(54) SYSTEM AND METHOD TO REDUCE AN AMOUNT OF SUNLIGHT AND AN AMOUNT OF SPECULAR REFLECTION IN DRONE SENSING

(71) Applicants: Sony Group Corporation, Tokyo (JP); Sony Corporation of America, New York, NY (US)

(72) Inventor: Cheng-Yi Liu, San Jose, CA (US)

(73) Assignees: SONY GROUP CORPORATION, Tokyo (JP); SONY CORPORATION OF AMERICA, New York, NY (US)

( * ) Notice: Subject to any disclaimer, the term of this patent is extended or adjusted under 35 U.S.C. 154(b) by 230 days.

(21) Appl. No.: 17/871,262

(22) Filed: Jul. 22, 2022

(65) Prior Publication Data
US 2024/0031670 A1  Jan. 25, 2024

(51) Int. Cl.
*H04N 23/60* (2023.01)
*G06T 7/70* (2017.01)
*G06T 17/20* (2006.01)

(52) U.S. Cl.
CPC ............... *H04N 23/64* (2023.01); *G06T 7/70* (2017.01); *G06T 17/20* (2013.01); *G06T 2207/10032* (2013.01); *G06T 2207/30241* (2013.01)

(58) Field of Classification Search
CPC ........... H04N 23/64; G06T 7/70; G06T 17/20; G06T 2207/10032; G06T 2207/30241
See application file for complete search history.

(56) References Cited

U.S. PATENT DOCUMENTS

2017/0293297 A1* 10/2017 Kim ..................... B64C 39/024
2022/0076031 A1    3/2022 Mccoy

FOREIGN PATENT DOCUMENTS

| CN | 108445904 A | 8/2018 |
| CN | 112857356 A | 5/2021 |

* cited by examiner

*Primary Examiner* — Girumsew Wendmagegn
(74) *Attorney, Agent, or Firm* — Trellis IP Law Group, PC (57) ABSTRACT

An apparatus includes one or more processors and logic encoded in one or more non-transitory media for execution by the one or more processors and when executed operable to receive sensor data from a drone that travels around a target object. The logic is further operable to generate, based on the sensor data, a first three-dimensional (3D) reconstruction of the target object. The logic is further operable to estimate a direction of sunlight and a direction of spectral reflection. The logic is further operable to plan a trajectory of sensor capturing positions for the drone to capture images of the target object that reduce an amount of sunlight and an amount of specular reflection.

20 Claims, 8 Drawing Sheets

SYSTEM AND METHOD TO REDUCE AN AMOUNT OF SUNLIGHT AND AN AMOUNT OF SPECULAR REFLECTION IN DRONE SENSING

CROSS REFERENCES TO RELATED APPLICATIONS

This application is related to U.S. patent application Ser. No. 17/344,659 entitled "Extraneous Content Removal from Images of a Scene Captured by a Multi-done Swarm," filed Jun. 10, 2021, the entirety of which is incorporated by reference as if set forth in full in this application for all purposes.

BACKGROUND

Drones are used to capture images during flight. Sunlight presents a problem for image capture because although direct sunlight helps with obtaining clearer images, too much direct sunlight causes saturation and overexposure of the images. In addition, excess sunlight may damage the optical sensors in the drone. Lastly, specular reflection of sunlight, which is when the light causes a reflection from a surface, also contributes to poor image quality.

Current approaches to addressing these problems may rely on a user that designs trajectories to avoid sun-facing directions. However, the quality of the images may vary based on the user's experience and manual operation of the drone will not avoid specular reflection. Another approach is for a user to perform manual review of the images to identify errors or to use registration or reconstruction tools to identify images that cannot be aligned with other images based on having inaccurate coloring. The problematic images may undergo post-processing to apply color collection. However, review and post-processing is time consuming and may cause color distortion in the images.

SUMMARY

In some embodiments, an apparatus includes one or more processors and logic encoded in one or more non-transitory media for execution by the one or more processors and when executed operable to receive sensor data from a drone that travels around a target object. The logic is further operable to generate, based on the sensor data, a first three-dimensional (3D) reconstruction of the target object. The logic is further operable to estimate a direction of sunlight and a direction of spectral reflection. The logic is further operable to plan a trajectory of sensor capturing positions for the drone to capture images of the target object that reduce an amount of sunlight and an amount of specular reflection.

In some embodiments, the amount of sunlight and the amount of specular reflection are reduced based on loss functions. In some embodiments, the amount of sunlight and the amount of specular reflection are reduced based a forbidden space inside a cone associated with the direction of the sunlight and a forbidden space inside a cone associated with the direction of the spectral reflection. In some embodiments, generating the first 3D reconstruction of the target object includes: generating a 3D mesh of the target object and estimating a normal of each face of the target object. In some embodiments, the logic when executed is further operable to generate a confidence value for each pixel in a captured image based on the amount of sunlight or the amount of specular reflection. In some embodiments, the drone travels around the target object using a swinging scan pattern. In some embodiments, planning the trajectory of sensor capturing positions includes: weighting each two-dimensional (2D) pixel in a candidate image based on the amount of sunlight and the amount of specular reflection and planning the trajectory of sensor capturing positions to capture the images with weights that minimize the amount of sunlight and the amount of specular reflection. In some embodiments, the logic when executed is further operable to generate a second 3D reconstruction of the target object based on captured images of the target object, wherein the second 3D reconstruction is more detailed than the first 3D reconstruction. In some embodiments, generating the second 3D reconstruction of the target object includes discarding one or more images from the captured images for the second 3D reconstruction with weights that fail to meet a threshold value, wherein the weights reflect a confidence in favorable pixel properties.

In some embodiments, a computer-implemented method includes: receiving sensor data from a drone that travels around a target object, generating, based on the sensor data, a first 3D reconstruction of the target object, estimating a direction of sunlight and a direction of spectral reflection, and planning a trajectory of sensor capturing positions for the drone to capture images of the target object that reduce an amount of sunlight and an amount of specular reflection.

In some embodiments, the amount of sunlight and the amount of specular reflection are reduced based on loss functions. In some embodiments, the amount of sunlight and the amount of specular reflection are reduced based a forbidden space inside a cone associated with the direction of the sunlight and a forbidden space inside a cone associated with the direction of the spectral reflection. In some embodiments, generating the first 3D reconstruction of the target object includes: generating a 3D mesh of the target object and estimating a normal of each face of the target object. In some embodiments, the operations further include generating a confidence value for each pixel in a captured image based on the amount of sunlight or the amount of specular reflection.

In some embodiments, software encoded in one or more computer-readable media for execution by the one or more processors when executed is operable to: receive sensor data from a drone that travels around a target object, generate, based on the sensor data, a first 3D reconstruction of the target object, estimate a direction of sunlight and a direction of spectral reflection, and plan a trajectory of sensor capturing positions for the drone to capture images of the target object that reduce an amount of sunlight and an amount of specular reflection.

In some embodiments, the amount of sunlight and the amount of specular reflection are reduced based on loss functions. In some embodiments, the amount of sunlight and the amount of specular reflection are reduced based a forbidden space inside a cone associated with the direction of the sunlight and a forbidden space inside a cone associated with the direction of the spectral reflection. In some embodiments, generating the first 3D reconstruction of the target object includes: generating a 3D mesh of the target object and estimating a normal of each face of the target object. In some embodiments, the software is further operable to generate a confidence value for each pixel in a captured image based on the amount of sunlight or the amount of specular reflection.

Advantages described in the application are numerous. First, because drones are required to include GNSS receivers starting in October 2023, no new hardware is required to implement the application. Second, the trajectory application saves time by automatically determining a trajectory that reduces an amount of sunlight and an amount of specular reflection instead of requiring user input. Third, the trajectory application may be used in real-time and include a computationally less demanding process for calculations based on loss function. Lastly, the trajectory application may be used to improve the quality of 3D reconstruction of the color consistency in four-dimensional (4D) reconstruction.

A further understanding of the nature and the advantages of particular embodiments disclosed herein may be realized by reference of the remaining portions of the specification and the attached drawings.

DETAILED DESCRIPTION OF EMBODIMENTS

Example Environment 100

Figure 1:
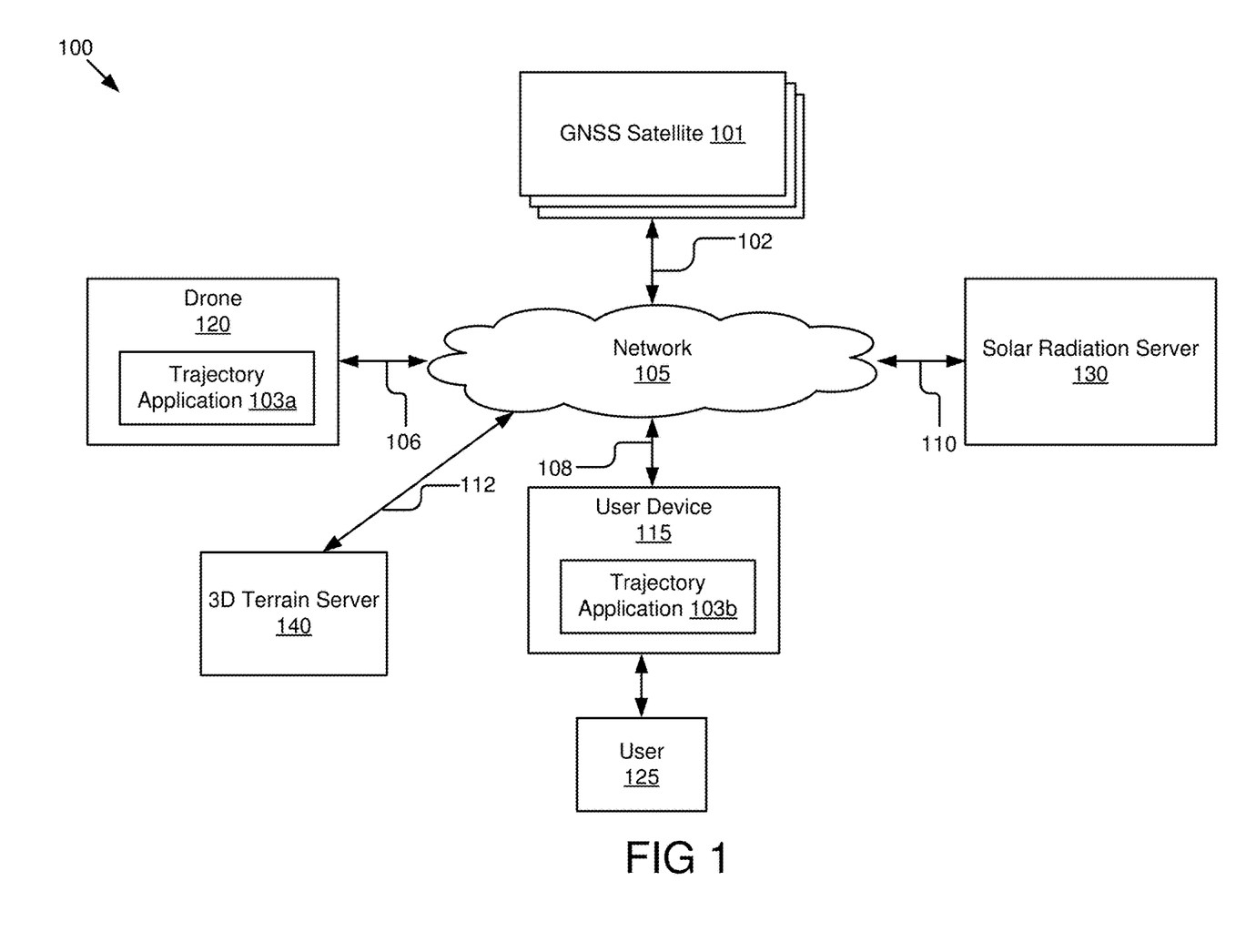
FIG. 1 is a block diagram of an example network environment according to some embodiments described herein.

FIG. 1 illustrates a block diagram of an example environment 100. In some embodiments, the environment 100 includes global navigation satellite system (GNSS) satellites 101, a solar radiation server 130, a drone 120, and a user device 115. A user 125 may be associated with the user device 115. In some embodiments, the environment 100 may include other servers or devices not shown in FIG. 1. For example, the drone 120 may be multiple drones 120a,120n, the user device 115 may be multiple user devices 115a, 115n, etc. In FIG. 1 and the remaining figures, a letter after a reference number, e.g., "120a," represents a reference to the element having that particular reference number. A reference number in the text without a following letter, e.g., "120," represents a general reference to embodiments of the element bearing that reference number.

The GNSS satellites 101 may each include a processor, a memory, network communication hardware, a power system, and a propulsion system. The network communication system may include antennas and transponders that receive and retransmit signals. The power system may include solar panels that provide the power.

The GNSS satellites 101 are communicatively coupled to the network 105 via signal line 102. Signal line 102 may be a wireless connection, such as radio. In some embodiments, the GNSS satellites 101 send and receive data to and from one or more of the drone 120 or the user device 115 via the network 105. For example, the GNSS satellites 101 send GNSS positioning and time data to the drone 120 or the user device 115.

The solar radiation server 130 includes a processor, a memory, and network communication hardware. The solar radiation server 130 is communicatively coupled to the network 105 via signal line 110. In some embodiments, the solar radiation server 130 provides sunlight data to the drone 120 or the user device 115. The sunlight data may include local solar data and time. Specifically, the sunlight day may include an amount of solar radiation that reaches a particular geographic location at different times. In some embodiments, the sunlight data includes additional information that may affect the amount of solar radiation, such as atmospheric conditions. For example, as sunlight passes through the atmosphere, some of it is absorbed, scattered, and reflected by air molecules, water vapor, clouds, dust, pollutants, forest fires, and volcanoes. Atmospheric conditions may reduce solar radiation by 10-100%.

The 3D terrain server 140 includes a processor, a memory, and network communication hardware. The 3D terrain server 140 is communicatively coupled to the network 105 via signal line 112. In some embodiments, the 3D terrain server 140 provides geodetic 3D terrain survey data that is generated from satellite information. One example of such a service includes Google Earth®.

The drone 120 may be a computing device that includes a memory, a hardware processor, a propulsion system, a GNSS receiver, a camera, and a trajectory application 103a. In the illustrated embodiment, the drone 120 is coupled to the network 105 via signal line 106. Signal line 106 may be a wireless connection, such as radio, Wi-Fi®, Bluetooth®, or other wireless technology.

In some embodiments, the drone 120 performs a fast scan by travelling around a target object in order to collect sensor data. In some embodiments, the sensor data is received from the 3D terrain server 140 in the form of geodetic 3D terrain survey data. In some embodiments, the trajectory application 103a uses the sensor data to generate a three-dimensional (3D) reconstruction of the target object and plan a trajectory of sensor capturing positions of the drone 120 to capture images of the target object that reduce an amount of sunlight and an amount of specular reflection. In other embodiments, the trajectory application 103a transmits the sensor information to a trajectory application 103b stored on the user device, which generates the 3D reconstruction of the target object and plans the trajectory of sensor capturing positions of the drone 120.

The user device 115 may be a computing device that includes a memory, a hardware processor, a GNSS receiver, and a trajectory application 103b. The user device 115 may include a mobile device, a tablet computer, a laptop, a mobile telephone, a wearable device, a head-mounted display, a mobile email device, or another electronic device capable of accessing a network 105 to communicate with the GNSS satellites 101. In the illustrated embodiment, user device 115a is coupled to the network 105 via signal line 108. Signal line 108 may be a wireless connection, such as radio, Wi-Fi®, Bluetooth®, or other wireless technology. The user device 115 is accessed by user 125.

In some embodiments where the trajectory application 103b plans the trajectory of sensor capturing positions of the drone 120, the trajectory application 103b receives GNSS positioning and time data from the GNSS satellites 101, sensor data from the drone 120 or the 3D terrain server 140, generates a 3D reconstruction of the target object, estimates a direction of the sunlight, and plans a trajectory of sensor capturing positions of the drone 120 to capture images of the target object that reduce an amount of sunlight and an amount of specular reflection. The trajectory application 103b may transmit the planned trajectory to the drone 120 for implementation.

Computing Device 200 Example

Figure 2:
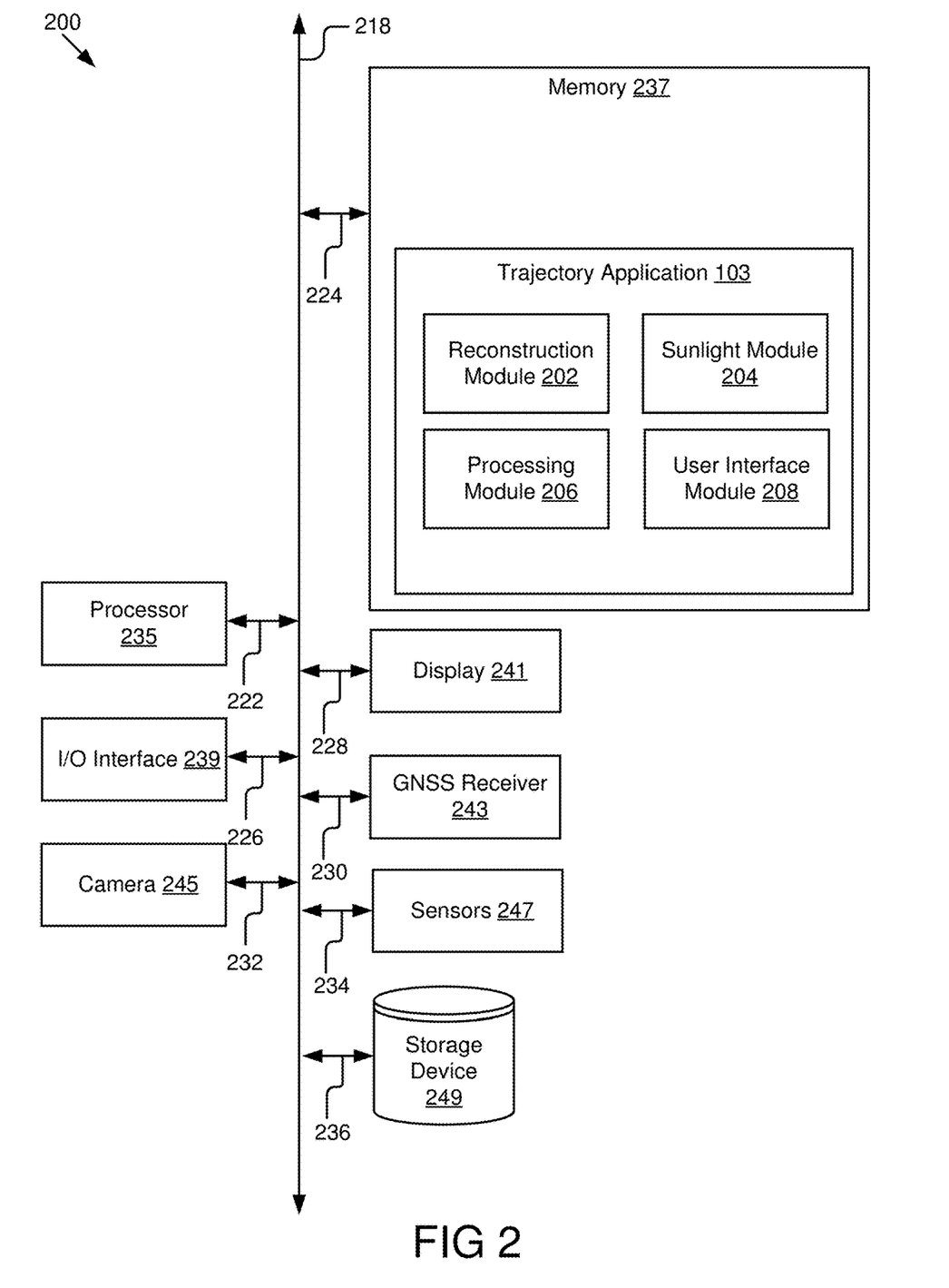
FIG. 2 is a block diagram of an example computing device according to some embodiments described herein.

FIG. 2 is a block diagram of an example computing device 200 that may be used to implement one or more features described herein. The computing device 200 can be any suitable computer system, server, or other electronic or hardware device. In one example, the computing device 200 is the drone 120 illustrated in FIG. 1. In another example, the computing device 200 is the user device 115 illustrated in FIG. 1.

In some embodiments, computing device 200 includes a processor 235, a memory 237, an Input/Output (I/O) interface 239, a display 241, a GNSS receiver 243, a camera 245, sensors 247, and a storage device 249. The processor 235 may be coupled to a bus 218 via signal line 222, the memory 237 may be coupled to the bus 218 via signal line 224, the I/O interface 239 may be coupled to the bus 218 via signal line 226, the display 241 may be coupled to the bus 218 via signal line 228, the GNSS receiver 243 may be coupled to the bus 218 via signal line 230, the camera 245 may be coupled to the bus 218 via signal line 232, the sensors 247 may be coupled to the bus 218 via signal line 234, and the storage device 249 may be coupled to the bus 218 via signal line 236.

The processor 235 can be one or more processors and/or processing circuits to execute program code and control basic operations of the computing device 200. A "processor" includes any suitable hardware system, mechanism or component that processes data, signals or other information. A processor may include a system with a general-purpose central processing unit (CPU) with one or more cores (e.g., in a single-core, dual-core, or multi-core configuration), multiple processing units (e.g., in a multiprocessor configuration), a graphics processing unit (GPU), a field-programmable gate array (FPGA), an application-specific integrated circuit (ASIC), a complex programmable logic device (CPLD), dedicated circuitry for achieving functionality, or other systems. A computer may be any processor in communication with a memory.

The memory 237 is typically provided in computing device 200 for access by the processor 235 and may be any suitable processor-readable storage medium, such as random access memory (RAM), read-only memory (ROM), Electrical Erasable Read-only Memory (EEPROM), Flash memory, etc., suitable for storing instructions for execution by the processor or sets of processors, and located separate from processor 235 and/or integrated therewith. Memory 237 can store software operating on the computing device 200 by the processor 235, including the trajectory application 103.

The I/O interface 239 can provide functions to enable interfacing the computing device 200 with other systems and devices. Interfaced devices can be included as part of the computing device 200 or can be separate and communicate with the computing device 200. For example, network communication devices, storage devices (e.g., the memory 237 or the storage device 249), and input/output devices can communicate via I/O interface 239. In some embodiments, the I/O interface 239 can connect to interface devices such as input devices (keyboard, pointing device, touchscreen, microphone, sensors, etc.) and/or output devices (display devices, speaker devices, etc.).

Some examples of interfaced devices that can connect to I/O interface 239 can include a display 241 that can be used to display content, e.g., a GUI, and to receive touch (or gesture) input from a user. Display 241 can include any suitable display device such as a liquid crystal display (LCD), light emitting diode (LED), or plasma display screen, cathode ray tube (CRT), television, monitor, touchscreen, three-dimensional display screen, or other visual display device. For example, display 241 can be a flat display screen provided on a mobile device, multiple display screens embedded in a glasses form factor or headset device, or a monitor screen for a computer device.

The GNSS receiver 243 includes an Inertial Measurement Unit (IMU), one or more antennas, and a radio frequency (RF) front end. The IMU includes gyroscopes to measure and report angular rate and accelerometers to measure and report specific force. In some embodiments, the GNSS receiver 243 implements a Real-Time Kinematic (RTK) method for determining the position of the drone 120. This data allows the drone 120 to compute the orientation of captured images in a global 3D coordinate system. In some embodiments, the RTK GNSS-IMU is combined with additional positioning modalities, such as visual odometry to increase the accuracy of the positioning calculations.

In some embodiments, the RF front end includes a low-noise amplifier (LNA), a mixer, a band-pass filter (BPF), and an Analog-to-Digital-Converter (ADC). The one or more antennas receive a signal at a radio frequency from the GNSS satellites 101. The RF front end processes the signal by, for example, converting the signal at a radio frequency to a lower intermediate frequency and digitizing the lower intermediate frequency signal. The GNSS receiver 243 transmits the digitized signal to the trajectory application 103 via the I/O interface 239.

The camera 245 may be any type of image capture device that can capture images and/or video. The camera 245 includes an optical sensor, which is also known as an image sensor. The optical sensor converts light waves into signals. In some embodiments, the camera 245 moves independently of the drone 120 and is calibrated with the drone's 120 coordinates. In some embodiments, the camera 245 captures images or video that the I/O interface 239 transmits to the trajectory application 103.

The intrinsic parameters (such as focal length, sensor size etc) of the camera 245 are assumed to be known, as they determine the relationships between positions in the real 3D world and positions in the 2D image captured by that camera.

The sensors 247 may include hardware that collects sensor data. For example, where the computing device 200 is a drone 120, the sensor set may include light detection and ranging (LIDAR) instruments such as a laser, a scanner, and a GPS receiver for implementing the remote sensing method, an infrared (IR) detector, an ultrasonic sensor that measures a distance to an object using ultrasonic sound waves, a thermostat, a battery sensor, etc. For example, the sensors 247 may measure one or more of a current time, a location (e.g., a latitude, longitude, and altitude of a done 120), an acceleration of a drone 120, a velocity of a drone 120, a battery level of a drone 120, etc.

The storage device 249 stores data related to the trajectory application 103. For example, the storage device 249 may store GNSS positioning and time data about the GNSS satellites 101, sunlight data from the solar radiation server 130, sensor data generated by the camera 245 and the sensors 247, 3D reconstructions of target objects, trajectories, etc.

Example Trajectory Application 103

In some embodiments, the satellite application 103 includes a reconstruction module 202, a sunlight module 204, a processing module 206, and a user interface module 208.

The reconstruction module 202 generates a 3D reconstruction of a target object. In some embodiments, the reconstruction module 202 includes a set of instructions executable by the processor 235 to generate the 3D reconstruction. In some embodiments, the reconstruction module 202 is stored in the memory 237 of the computing device 200 and can be accessible and executable by the processor 235.

In some embodiments, the drone 120 generates sensor data while traveling around a target object or from the 3D terrain server 140. The process of generating the sensor data for a 3D reconstruction of the target may be referred to as a fast scan or survey scan. The sensor data may be of a lower quality or lower spatial resolution than a more detailed scan because the sensor data is used to generate a coarse-level 3D reconstruction of the target object.

The target object may include, for example, a landmark, a building, a bridge, a vehicle, a person, etc. In some embodiments, the target object is specified via the user interface module 208 as discussed in greater detail below. The sensor data may include images (e.g., color images, black and white images, etc.) captured by the camera 245 or other sensor data generated by the sensors 247, such as IR images, LIDAR points, distances from the drone to the ground or an object as determined by time-of-flight information from the ultrasound sensor etc.

In some embodiments, the reconstruction module 202 instructs the drone to fly around the target object to collect the sensor data. For example, the reconstruction module 202 may plan a trajectory for travelling around the target object or a user that controls the drone 120 may plan the trajectory for travelling around the target object. In some embodiments where the drone 120 includes a camera 245 that rotates, the drone 120 uses a swinging scan pattern where the drone 120 or, more specifically, the camera 245, fluctuates a yaw angle in a small range during collection of the sensor data to reduce an impact of unknown sunlight and reflection directions on the quality of images captured during the trajectory.

The reconstruction module 202 receives the sensor data from the drone 120 if the drone 120 is separate from the computing device 200 or the reconstruction module 202 receives the sensor data from the camera 245 and/or the sensors 247 via the I/O 239 if the computing device 200 is stored on the drone 120.

In some embodiments, sensor data from a drone 120 that includes location data is described in drone coordinates or sensor coordinates, such as camera coordinates. The reconstruction module 202 converts the drone coordinates or the camera coordinates to global coordinates because global coordinates are fixed 3D coordinates in the real-world. In addition, the GNSS positioning data received from the GNSS satellites 101 may be expressed as global coordinates, making global coordinates a more consistent system to use.

Figure 3:
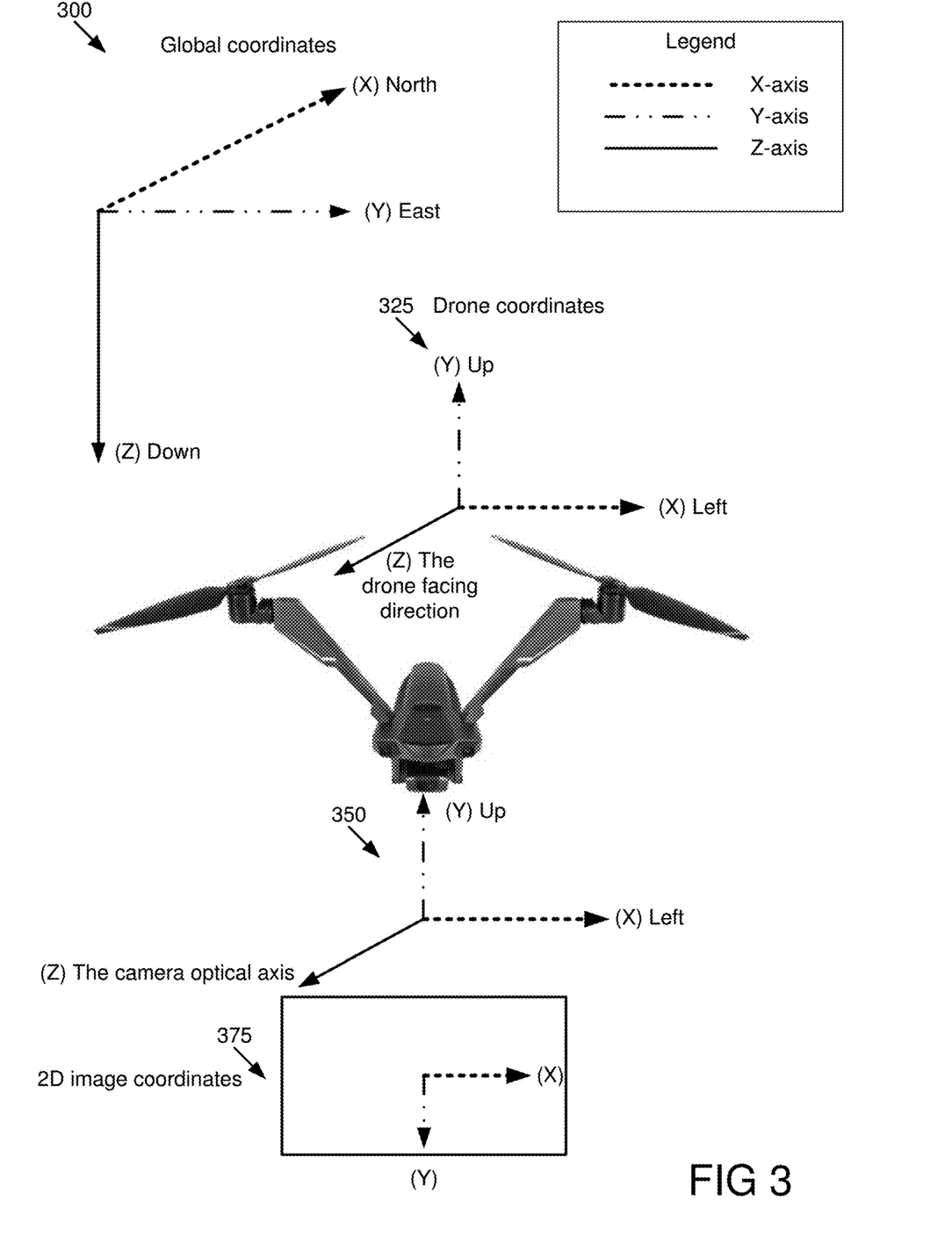
FIG. 3 is an example comparison of global positioning satellite coordinates as compared to drone coordinates, camera coordinates, and a conversion to two-dimensional image coordinates according to some embodiments described herein.

Turning to FIG. 3, a comparison of the GPS coordinates as compared to the drone coordinates, the camera coordinates, and a conversion to 2D image coordinates is illustrated. In this example, the GPS coordinates 300 are defined based on a north-east down (NED) system, which is used for drones 120 because the target objects are below the drone 120 so it is practical to define the down coordinates of the Z-axis as a positive number. The drone coordinates 325 and the camera optical axis 350 may be the same when the front of the drone 120 is facing the same direction as the camera 245 on the drone 120. In instances where the camera 245 is attached to the drone 120 via a rotatable gimbal, the camera optical axis 350 may be different from the drone coordinates 325, resulting in six degrees of freedom (DoF) during a flight. However, the changes between the drone coordinates 325 and the camera optical axis 350 are known and the reconstruction module 202 may convert the drone coordinates 325 based on the direction change. Lastly, the camera 245 may include 2D image coordinates 375 that are defined on the camera sensor and are fixed to the camera body so the transformation between the 2D image coordinates 375 and the global coordinates 300 is known.

In some embodiments, the reconstruction module 202 generates the 3D reconstruction of the target object by generating a rough 3D mesh ($M_O$) or pointcloud of the target object and estimates a normal of each face of the target object. In some embodiments, the reconstruction module 202 employs third-party software to calculate the rough 3D mesh of the target object, such as Metashape, RealityCapture, or COLMAP. In some embodiments, the reconstruction module 202 estimates the normal of each face of the target object based on the 3D mesh or the pointcloud. For example, where the surface $F_j$ has the planar face j, the reconstruction module 202 may estimate the normal vector $\vec{N}_j$ of surface $F_j$ during the generation of mesh $M_O$ from the rough 3D mesh or the pointcloud. In some embodiments, the reconstruction module 202 applies filtering to regularize the normals.

The sunlight module 204 plans a trajectory of the drone 120 to capture images of the target object that avoid an amount of sunlight and specular reflection. In some embodiments, the sunlight module 204 includes a set of instructions executable by the processor 235 to plan the trajectory of the drone 120. In some embodiments, the sunlight module 204 is stored in the memory 237 of the computing device 200 and can be accessible and executable by the processor 235.

The sunlight module 204 estimates a direction of the sunlight $\vec{R}_S$. In some embodiments, the sunlight module 204 receives sunlight data from the solar radiation server 130 or another source. For example, the sunlight data may include an amount of solar radiation that reaches a particular geographic location at different times and how the amount of solar radiation is affected by atmospheric conditions. The sunlight module 204 identifies solar radiation that is predicted for particular locations at particular times and at different angles. In some embodiments, the sunlight module 204 generates a confidence value associated with the different predictions. For example, the sunlight module 204 determines that an image of the target object captured at a particular angle, at a particular time, at a particular location has a 95% confidence rate of avoiding an amount of sunlight and an amount of specular reflection. In some embodiments, the sunlight data also includes solar time and the hour angle of the solar time, which is a calculation of the passage of time based on the position of the sun in the sky. Solar time is based on the motion of the sun and therefore depends on a particular date. The hour angle is a measure of the angular distance between the sun at the local solar time and the sun at solar noon.

Figure 4:
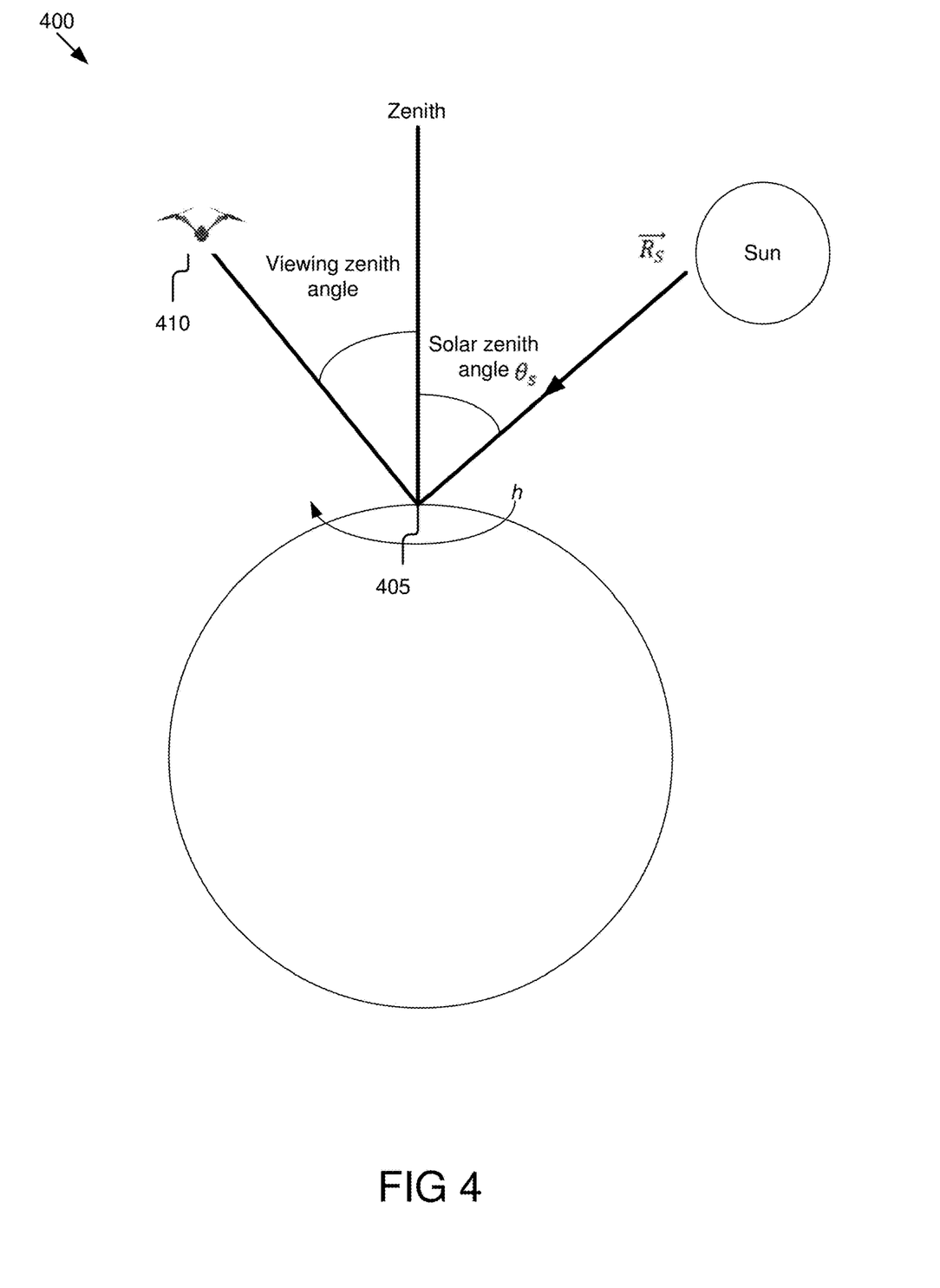
FIG. 4 is an example block diagram of the solar zenith angle based on the location of the drone according to some embodiments described herein.

In some embodiments, the sunlight module 204 estimates the direction of sunlight $\vec{R}_S$ by calculating the solar zenith angle $\theta_s$, which is the angle between a target object and the line of sight from the drone 120 to the sun. The higher the sun in the sky, the lower the solar zenith angle. Turning to FIG. 4, an example block diagram 400 of the solar zenith angle based on the location of the drone 410 is illustrated. The zenith is a point directly above the target object 405. The direction of sunlight $\vec{R}_S$ is the line between the target object 405 and the sun. The viewing zenith angle is the angle between the drone 410 and the zenith. The solar zenith angle $\theta_s$ is the angle between the zenith and the sun. The solar zenith angle $\theta_s$ changes based on the time of day as measured by the hour angle h.

Assuming that the ground plane is locally a tangent plane with respect to the center of the earth, the solar zenith angle $\theta_s$ is calculated using the relation in equation 1:

$$\cos\theta_s = \sin\phi\sin\delta + \cos\phi\cos\delta\cos h \qquad \text{Eq. 1}$$

where $\theta_s$ is the solar zenith angle, $\phi$ is the local latitude, $\delta$ is the current declination of the sun, and h is the hour angle in local solar time.

In some embodiments, the sunlight module 204 determines the local latitude $\phi$ and the longitude of the current position of the drone 120 based on the GNSS positioning and time data received from the GNSS satellites 101. The sunlight module 204 may estimate the hour angle h based on the local solar time for the particular date. The sunlight module 204 may calculate the current declination of the sun $\delta$ based on the local latitude $\phi$ and the local solar time.

The sunlight module 204 calculates the zenith solar angle $\theta_s$ and then calculates the sunlight direction $\vec{R}_S$ based on the zenith solar angle $\theta_s$ and the local solar time.

The sunlight module 204 determines a target area to avoid based on the target area including an amount of sunlight and an amount of specular reflection. Specular reflection occurs when a light ray reflects off of a smooth surface at an equal but opposite angle to the incoming angle. If the optical sensor on the drone 120 captured the specular reflection light ray, it would receive the greatest portion of light from the sun.

Figure 5:
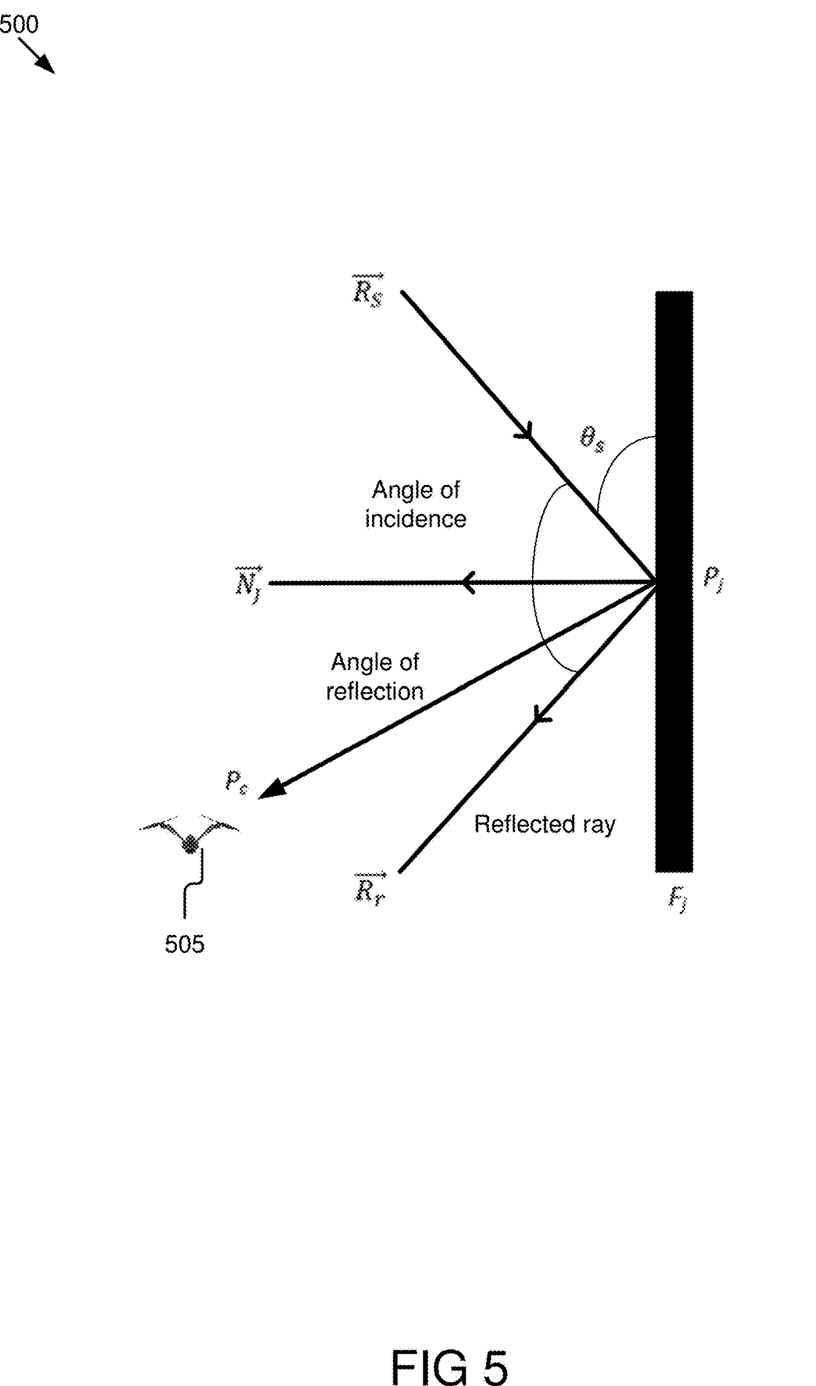
FIG. 5 is an example block diagram of specular reflection according to some embodiments described herein.

Turning to FIG. 5, an example block diagram of specular reflection is illustrated. The incident ray is received at a three-dimensional reference point $P_j$ on surface $F_j$ of planar face j. The incident ray is reflected off of the surface $F_j$ as the reflected ray and a surface normal is defined as the ray that is perpendicular to the surface $F_j$.

The angle of incidence is defined as the angle between the incident ray and the normal ray. The angle of reflection is the angle between the reflected ray and the surface normal. The angle of incidence is equal to the angle of reflection.

In this example, the drone 505 is capturing an image within the area defined by the angle of reflection. By calculating the next sensor capturing position $P_c$, the sunlight module 204 determines a likelihood that the next sensor capturing position $P_c$ will experience an amount of sunlight and an amount of specular reflection.

Because the sun is far from the earth and because the drone 120 is typically not travelling far because the battery of the drone lasts for about 30 minutes, the sunlight module 204 assumes that the zenith solar angle $\theta_s$ is identical for the area where the drone 120 captures images and that the zenith solar angle $\theta_s$ is time-variant only. In some embodiments, the sunlight module 204 identifies one or more surfaces of a target object from the 3D mesh $M_0$. The surface is designated as $F_j$. The sunlight module 204 calculates the sunlight direction $\vec{R}_S$ with a unit direction of sunlight in global coordinates based on the zenith solar angle $\theta_s$ and the local solar time.

The specular reflection direction $\vec{R}_r$ is based on the direction of the sunlight $\vec{R}_S$ and the normal vector $\vec{N}_j$ of the surface $F_j$. Specifically, the specular reflection direction $\vec{R}_r$ may be represented by equation 2 and then normalized to the unit length:

$$\vec{R}_r = 2(\vec{N}_j * \vec{R}_S)\vec{N}_j - \vec{R}_S \qquad \text{Eq. 2}$$

The sunlight module 204 uses the specular reflection direction $\vec{R}_r$ and the direction of the sunlight $\vec{R}_S$ as constraints in planning the next sensor capturing position $P_c$. The sunlight module 204 assumes that the sensor has its optical axis passing a 3D reference point $P_j$ on the surface $F_j$.

The next capturing sensor position $P_c$ determines $\vec{P_jP_c}$. In order to avoid a situation where $\vec{P_jP_c}*\vec{R}_r=1$ or where $\vec{P_jP_c}*\vec{R}_s=\pm1$, where +1 represents the drone 120 facing the sun and −1 represents capturing the drone's 120 shadows directly, such as during an eclipse, the sunlight module 204 defines the loss function as $\vec{P_jP_c}*\vec{R}_r$ with maximal loss defined as $\vec{P}_j$ $\vec{P}_c*\vec{R}_r=1$ and $\vec{P_jP_c}*\vec{R}_s=\pm1$.

Figure 6A:
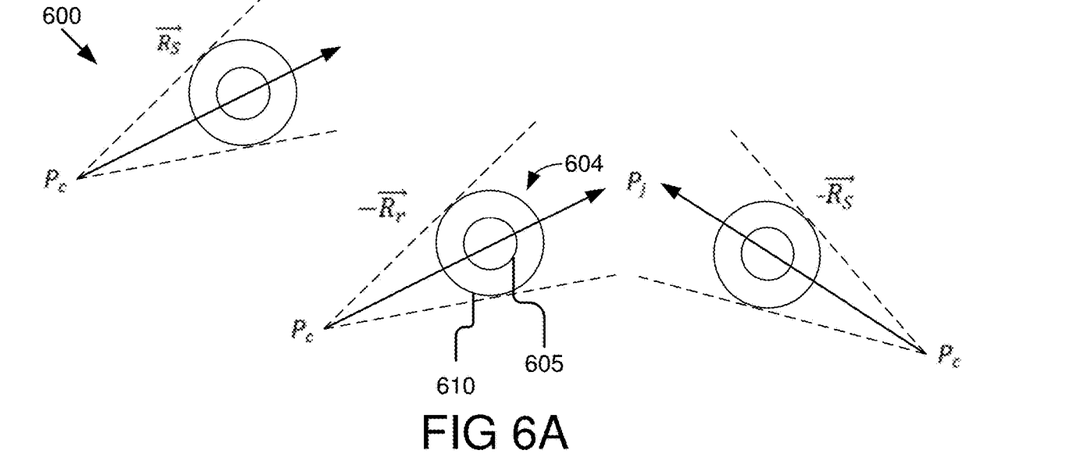
FIG. 6A is an example block diagram of loss heatmaps formed within cones based on the next capturing sensor position and the three-dimensional reference point according to some embodiments described herein.

Turning to FIG. 6A, an example block diagram 600 of loss heatmaps formed within cones based on the next capturing sensor position and the 3D reference point is illustrated for the loss function with maximal loss of $\vec{P_jP_c}*\vec{R}_s=1$, $\vec{P_jP_c}*\vec{R}_r=1$, and $\vec{P_jP_c}*\vec{R}_s=-1$. The heatmap 604 radiates from the ray created by the next capturing sensor position $P_c$ to the 3D reference point $P_j$. The closer an optical sensor is to capturing images that overlap with the center of the heatmap 604, the more the images should be avoided if possible. For example, an image that includes the center of the heatmap 604 would have poor image quality because the image would include the greatest amount of specular reflection.

In some examples, the inner circle of the heatmap 605 represents the highest amount of loss within the heatmap 604. In some embodiments, the sunlight module 204 plans a trajectory of the drone 120 that avoids capturing any images that overlap with the inner circle of the heatmap 605 or possibly captures an image only if there are no other options available. In some embodiments, the sunlight module 204 plans a trajectory of the drone 120 that tries to avoid capturing images between the outer circle of the heatmap 610 and the inner circle of the heatmap 610, but may include a path that overlaps with the area between the outer circle of the heatmap 610 and the inner circle of the heatmap 610 if preferable options are not available.

Figure 6B:
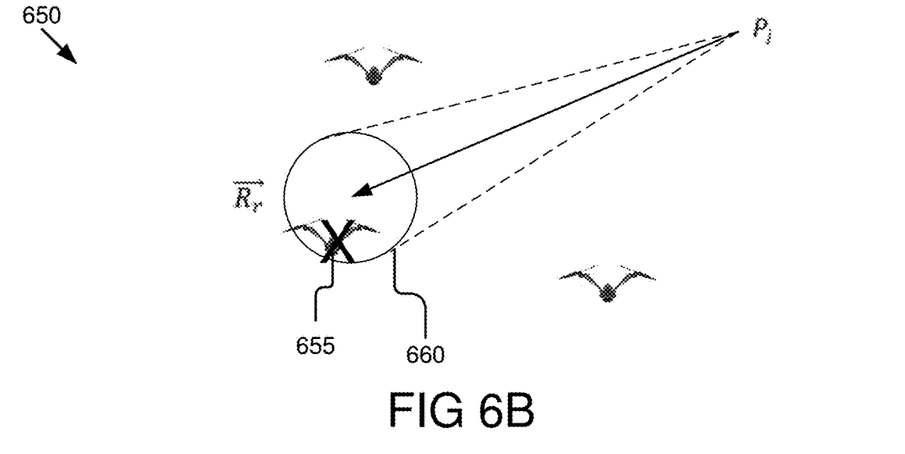
FIG. 6B is an example block diagram of a forbidden space for capturing images according to some embodiments described herein.

In some embodiments, instead of a loss function the sunlight module 204 defines a center of a cone for the direction of the specular reflection $\vec{R}_r$ and the direction of the sunlight $\vec{R}_S$ as a forbidden space. FIG. 6B is an example block diagram 650 of a forbidden space 660 for capturing images according to some embodiments described herein. Three example drones are illustrated and the drone 655 that overlaps with the forbidden space 660 is prohibited from capturing an image (as indicated by the X overlaid on the drone 655) because the image would include too much specular reflection.

In some embodiments, the sunlight module 204 uses additional factors to determine the next sensor capturing position $P_c$. For example, the sunlight module 204 may calculate the material albedo, specifically, the fraction of solar radiation reflected by the surface based on the material properties of the surface. In another example, the sunlight module 204 may receive additional sunlight data from the solar radiation server 130 about the weather and the atmospheric conditions; however, in some instances the amount of solar radiation received from the solar radiation server 130 is already modified based on predictions about the weather and the atmospheric conditions.

In some embodiments, the sunlight module 204 determines the next sensor capturing position $P_c$ based on a region of surfaces instead of a single surface or a spot. Given a candidate sensor capturing position P as parameterized for θ for the optical sensor on the drone 120, the sunlight module 204 determines a set V of faces of the 3D mesh $M_0$ that are visible in camera image I. In one embodiment, the sunlight module 204 determines a loss L (I, V, θ) of the candidate sensor capturing position P using equation 3:

$$L(I,V,\theta,\vec{R})=\Sigma_{\forall p \in I} l(p,P(V,p,\theta,\vec{R}))$$ Eq. 3 where $\vec{R}=\{\vec{R}_S,-\vec{R}_S,\vec{R}_r\}$ is the set of ray directions to avoid and l( ) is the pixel-wise loss designed in the same principle as the calculation of the loss function described above with reference to $\vec{P}_j\vec{P}_c*\vec{R}_S$ and $\vec{P}_j\vec{P}_c*\vec{R}_r$. The computation of l( ) may be based on the 3D point P by a ray tracing from p and the surface normal at P given V.

In some embodiments, the sunlight module 204 traverses all the pixels p in image I to evaluate L(I, V, θ) as described above. In some embodiments, the sunlight module 204 samples points from V.

Figure 6C:
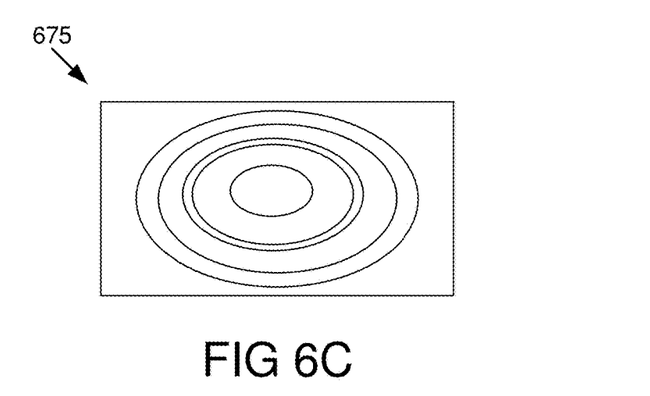
FIG. 6C is an example block diagram of an image that includes weighted pixels in different ovals that reflect different levels of pixel-wise loss according to some embodiments described herein.

In some embodiments, the sunlight module 204 assigns a different weight to each pixel or sample from image I. For example, turning to FIG. 6C, an example block diagram of an image that includes weighted pixels in different ovals that reflect different levels of pixel-wise loss is illustrated. In this example, all the pixels within one of the ovals is assigned a weight and the weight indicates greater loss the closer an oval is to the center of the image. This relationship may be described by equation 4:

$$l(p,V,\theta,\vec{R}) \rightarrow w_p l(p,V,\theta,\vec{R}))$$ Eq. 4 where $w_p$ is the weight of pixel p.

The sunlight module 204 plans a trajectory of sensor capturing positions for the drone to capture images of the target object that avoid an amount of sunlight and specular reflection. For example, the sunlight module 204 plans sensor capturing positions that minimize the amount of sunlight and the amount of specular reflection based on corresponding loss functions or cones of forbidden space. The sensor capturing positions may include the 3D location of the drone 120 as well as the 3D orientation of the optical sensor for a total of six DoF.

In some embodiments, the sunlight module 204 takes additional factors into account for planning the trajectory of sensor capturing positions, such as a battery life of the drone 120, a distance capability of the drone 120, applicable laws for drones (e.g., maintaining a height of 400 feet or lower), and a quality of a captured image as compared to a distance needed to obtain the best image. For example, the sunlight module 204 may plan a trajectory that makes compromises where the captured images may have a certain amount of sunlight and an amount of specular reflection that are more than the predetermined amount, but the drone 120 traversed a shortest path or the battery of the drone 120 did not fall below a threshold battery value. In some embodiments, the sunlight module 204 also instructs the camera 245 to tune the parameters of the camera 245 when the captured images have a certain amount of sunlight and specular reflection that are more than the predetermined amount. For example, the camera 245 may modify the exposure time, shutter speed, ISO value, etc.

In some embodiments, in response to receiving an updated local 3D map, the sunlight module 204 on the drone 120 adjusts the trajectory of sensor capturing positions on-the-fly. In some embodiments, in response to receiving the updated local 3D map, the sunlight module 204 on the user device 115 adjusts the trajectory of sensor capturing positions and sends the adjusted trajectory of sensor capturing positions to the drone 120. The updated local 3D map may include more accurate data than what the sunlight module 204 calculated for the 3D mesh $M_0$. It may be easier to modify the trajectory of sensor capturing positions on-the-fly when the sunlight module 204 is part of the drone 120 if the trajectory is based on cones of forbidden space instead of using loss functions.

The processing module 206 generates a detailed 3D reconstruction of the target object. In some embodiments, the processing module 206 includes a set of instructions executable by the processor 235 to generate the detailed 3D reconstruction. In some embodiments, the processing module 206 is stored in the memory 237 of the computing device 200 and can be accessible and executable by the processor 235.

In some embodiments, the processing module 206 generates the detailed 3D reconstruction from the detailed scan of the target object. For example, the processing module 206 may generate a 3D mesh using the same techniques described above with reference to the reconstruction module 202, but in this case the 3D mesh includes far more detail and color consistency.

In some embodiments, the processing module 206 processes the images before generating the detailed 3D reconstruction. For example, the processing module 206 may identify images that need to be corrected because of color discrepancies between the images. In some embodiments, the processing module 206 identifies images with lower-confidence values that are not needed to create the detailed 3D reconstruction and discards some of the images with lower-confidence values.

In some embodiments, the processing module 206 generates a four-dimensional (4D) reconstruction. For example, the processing module 206 may generate the detailed 3D reconstruction and then model movement of the 3D reconstruction as a function of time.

In some embodiments, a trajectory of sensor capturing positions may not be possible. Instead, the processing module 206 may receive captured images of the target object and apply sunlight and spectral reflection avoidance to the captured images. The processing module 206 may be able to perform these steps as long as the captured image is associated with sensor data that describes a position of the camera, a time of capture, and sensor parameters. In some embodiments, the processing module 206 determines, for a target 3D point of interest, its corresponding 2D pixel in the captured image and weights the pixel according to the angles between (1) the optical ray passing the pixel and (2) the ray of the specular reflection or the opposite direction of sunlight. The higher the weight of the pixel, the higher the confidence value in the properties of the pixel, such as color, depth, normal and position for purposes of generating the 3D reconstruction.

Figure 7:
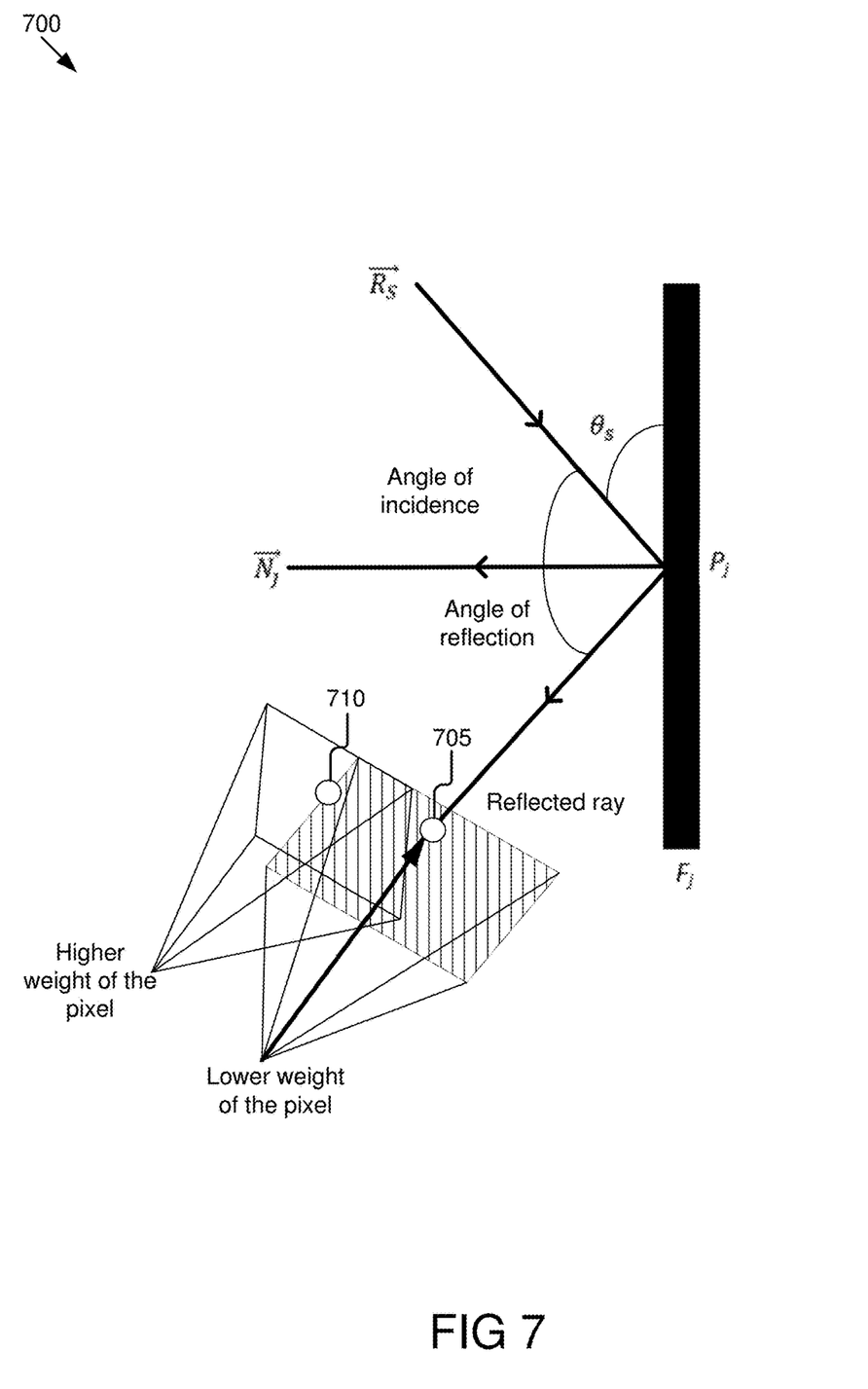
FIG. 7 is an example block diagram for weighting pixels during processing of captured images according to some embodiments described herein.

Turning to FIG. 7, an example block diagram 700 for weighting pixels during processing of captured images is illustrated. The target point of interest 705 that overlaps with the reflected ray has a lower weight than the target point of interest 710 that is still within the angle of reflection, but not as close to the reflected ray.

In some embodiments, instead of generating a weight for each pixel, the processing module 206 generates a weight for each image as a whole.

The user interface module 208 generates a user interface. In some embodiments, the user interface module 208 includes a set of instructions executable by the processor 235 to generate the user interface. In some embodiments, the user interface module 208 is stored in the memory 237 of the computing device 200 and can be accessible and executable by the processor 235.

In some embodiments, the user interface module 208 generates a user interface that enables a user to specify the target object. For example, the user interface may accept GPS coordinates for a building that is the target object, the user interface may display a map with objects on it where a user can specify that one or more of the objects is a target object, etc. In some embodiments, the user interface may also enable a user to specify a path for capturing images of the target object, a way to directly control the movements of the drone 120, etc.

Example Method 800

Figure 8:
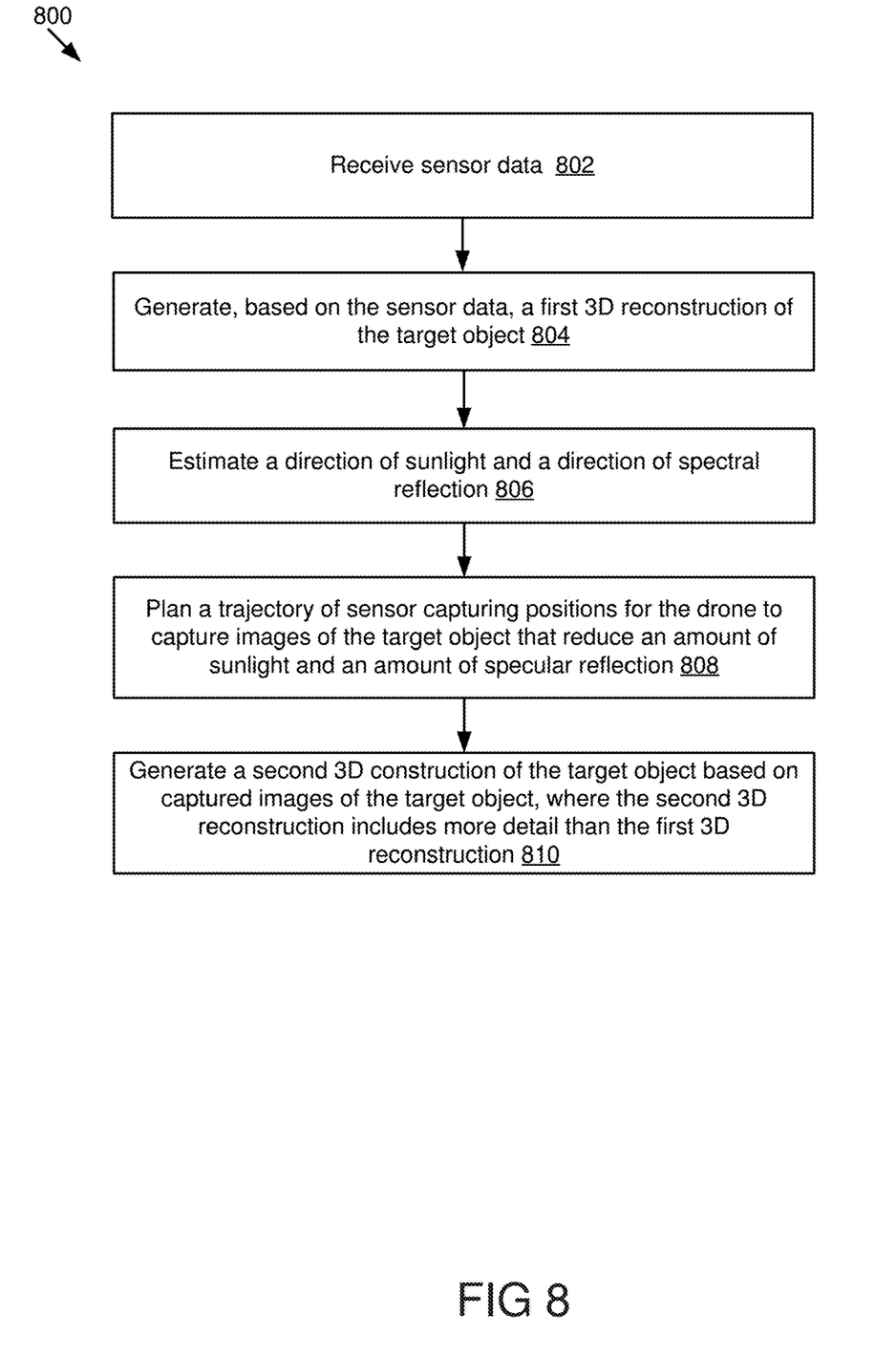
FIG. 8 illustrates an example flowchart for planning a trajectory of a drone to capture images of a target object according to some embodiments described herein.

FIG. 8 illustrates an example flowchart 800 for planning a trajectory of a drone to capture images of a target object. The method illustrated in flowchart 800 may be performed by the computing device 200 in FIG. 2. For example, the computing device 200 may be the drone 120 or the user device 115 illustrated in FIG. 1. The computing device 200 may include a trajectory application 103 that implements the steps described below.

The method 800 may start with block 802. At block 802, sensor data is received. For example, the sensor data is received from a drone 120 that travels around a target object or from the 3D terrain server 140. The sensor data may include images captured by a camera on the drone, but also IR images, LIDAR points, and distances from the drone to the ground or an object. Block 802 may be followed by block 804.

At block 804, a first 3D reconstruction of the target object is generated based on the sensor data. This process of obtaining sensor data and generating a rough 3D reconstruction, such as a 3D mesh, may be referred to as fast scanning. Block 804 may be followed by block 806.

At block 806, a direction of sunlight and a direction of spectral reflection are estimated. Block 806 may be followed by block 808.

At block 808, a trajectory of sensor capturing positions is planned for the drone to capture images of the target object that reduce an amount of sunlight and an amount of specular reflection. For example, the amount of sunlight and the amount of specular reflection are reduced based on loss functions, such that images closer to the direction of the sunlight or the direction of the specular reflection are avoided. In another example, the amount of sunlight and the amount of specular reflection are reduced based on a forbidden space inside a cone associated with the direction of the sunlight and a forbidden space inside a cone associated with the direction of the spectral reflection. Block 808 may be followed by block 810.

At block 810, a second 3D construction of the target object is generated based on captured images of the target object, where the second 3D reconstruction includes more detail than the first 3D reconstruction.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other non-transitory media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

I claim:

1. An apparatus comprising:
   one or more processors; and
   logic encoded in one or more non-transitory media for execution by the one or more processors and when executed operable to:
   receive sensor data about a target object;
   generate, based on the sensor data, a first three-dimensional (3D) reconstruction of the target object;
   estimate a direction of sunlight and a direction of spectral reflection; and
   plan a trajectory of sensor capturing positions for a drone to capture images of the target object that reduce an amount of sunlight and an amount of specular reflection.

2. The apparatus of claim 1, wherein the amount of sunlight and the amount of specular reflection are reduced based on loss functions.

3. The apparatus of claim 1, wherein the amount of sunlight and the amount of specular reflection are reduced based a forbidden space inside a cone associated with the direction of the sunlight and a forbidden space inside a cone associated with the direction of the spectral reflection.

4. The apparatus of claim 1, wherein generating the first 3D reconstruction of the target object includes:
   generating a 3D mesh of the target object; and
   estimating a normal of each face of the target object.

5. The apparatus of claim 1, wherein the logic when executed is further operable to generate a confidence value for each pixel in a captured image based on the amount of sunlight or the amount of specular reflection.

6. The apparatus of claim 1, wherein the sensor data is received from one or more of the drone that travels around the target object using a swinging scan pattern and geodetic 3D terrain survey data.

7. The apparatus of claim 1, wherein planning the trajectory of sensor capturing positions includes:
   weighting each two-dimensional (2D) pixel in a candidate image based on the amount of sunlight and the amount of specular reflection; and
   planning the trajectory of sensor capturing positions to capture the images with weights that minimize the amount of sunlight and the amount of specular reflection.

8. The apparatus of claim 1, wherein the logic when executed is further operable to adjust the trajectory of sensor capturing positions in response to receiving an updated 3D map of the target object while the drone is implementing the trajectory.

9. The apparatus of claim 1, wherein the logic when executed is further operable to generate a second 3D reconstruction of the target object based on captured images of the target object, wherein the second 3D reconstruction is more detailed than the first 3D reconstruction.

10. The apparatus of claim 9, wherein generating the second 3D reconstruction of the target object includes discarding one or more images from the captured images for the second 3D reconstruction with weights that fail to meet a threshold value, wherein the weights reflect a confidence in favorable pixel properties.

11. A computer-implemented method comprising:
    receiving sensor data about a target object;
    generating, based on the sensor data, a first three-dimensional (3D) reconstruction of the target object;
    estimating a direction of sunlight and a direction of spectral reflection; and
    planning a trajectory of sensor capturing positions for a drone to capture images of the target object that reduce an amount of sunlight and an amount of specular reflection.

12. The computer-implemented method of claim 11, wherein the amount of sunlight and the amount of specular reflection are reduced based on loss functions.

13. The computer-implemented method of claim 11, wherein the amount of sunlight and the amount of specular reflection are reduced based a forbidden space inside a cone associated with the direction of the sunlight and a forbidden space inside a cone associated with the direction of the spectral reflection.

14. The computer-implemented method of claim 11, wherein generating the first 3D reconstruction of the target object includes:
    generating a 3D mesh of the target object; and
    estimating a normal of each face of the target object.

15. The computer-implemented method of claim 11, further comprising generating a confidence value for each pixel in a captured image based on the amount of sunlight or the amount of specular reflection.

16. Software encoded in one or more non-transitory computer-readable media for execution by one or more processors and when executed is operable to:
    receive sensor data about a target object;
    generate, based on the sensor data, a first three-dimensional (3D) reconstruction of the target object;
    estimate a direction of sunlight and a direction of spectral reflection; and
    plan a trajectory of sensor capturing positions for a drone to capture images of the target object that reduce an amount of sunlight and an amount of specular reflection.

17. The software of claim 16, wherein the amount of sunlight and the amount of specular reflection are reduced based on loss functions.

18. The software of claim 16, wherein the amount of sunlight and the amount of specular reflection are reduced based a forbidden space inside a cone associated with the direction of the sunlight and a forbidden space inside a cone associated with the direction of the spectral reflection.

19. The software of claim 16, wherein generating the first 3D reconstruction of the target object includes:
    generating a 3D mesh of the target object; and
    estimating a normal of each face of the target object.

20. The software of claim 16, wherein the software is further operable to generate a confidence value for each pixel in a captured image based on the amount of sunlight or the amount of specular reflection.

* * * * *